(No Model.)

J. K. CHEW.
SPRING FOR VEHICLES.

No. 251,764.  Patented Jan. 3, 1882.

WITNESSES:
A. P. Grant,
F. Cooper.

INVENTOR:
Jos. K. Chew
BY John A. Diedersheim,
ATTORNEY.

UNITED STATES PATENT OFFICE.

JOSEPH K. CHEW, OF SALEM, NEW JERSEY.

SPRING FOR VEHICLES.

SPECIFICATION forming part of Letters Patent No. 251,764, dated January 3, 1882.

Application filed October 8, 1881. (No model.)

*To all whom it may concern:*

Be it known that I, JOSEPH K. CHEW, a citizen of the United States, residing at Salem, in the county of Salem, State of New Jersey, have invented a new and useful Improvement in Springs for Vehicles, which improvement is fully set forth in the following specification and accompanying drawings, in which—

Figure 1:
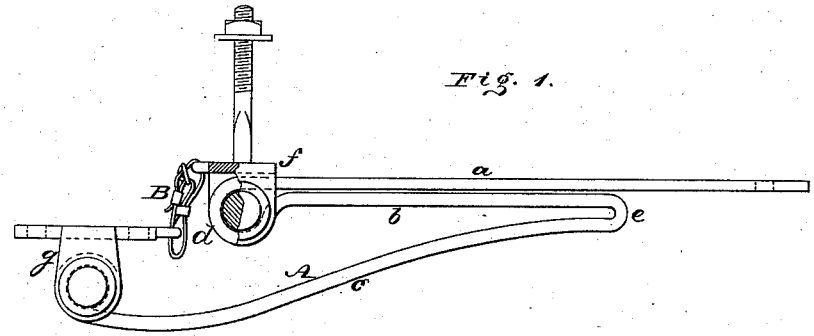
Figure 2:
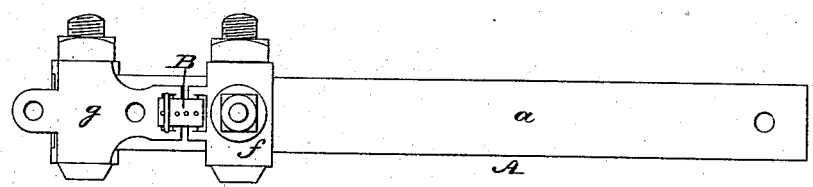
Figure 3:
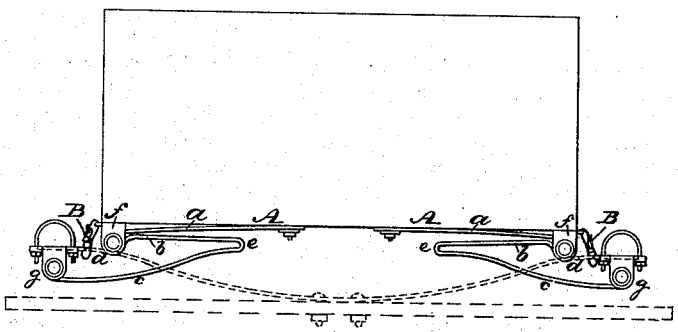

Figure 1 is a side elevation of the spring embodying my invention, partly broken away. Fig. 2 is a top or plan view thereof. Fig. 3 is an end view of the body of a wagon having my invention applied to it.

Similar letters of reference indicate corresponding parts in the several figures.

My invention consists of a spring, of the order of an elliptic spring, formed of three leaves which are continuous of each other, thus producing a duplication of springs, the effect whereof is to form a spring which rides easily and is of great resiliency, and may be conveniently and cheaply constructed.

Referring to the drawings, A represents the spring, which is formed of the three leaves $a\ b\ c$, which extend one above the other, and are continuous of each other, the spring being produced by bending a piece of metal, as at $d$, thus forming the straight leaves $a\ b$, which extend parallel, or nearly so, and further bending the metal, as at $e$, forming the leaf $c$, which is curved or elliptical. The top leaves, $a$, of the set of springs are rigidly bolted to the body of the vehicle, and the bends $d$ receive the bolts of the clips or bearings $f$, whereby further provision is made for bolting the springs to the vehicle. The outer ends of the leaves are formed with eyes which receive the bolts of clips $g$, adapted for attachment to the side spars of the vehicle when the springs are arranged transversely, or to the axles when the springs are arranged longitudinally; but the springs may be otherwise connected to the running-gear or to other springs thereon.

It will be seen that when the springs are loaded the leaves $c$ approach the leaf $b$, this being permitted by the bends $e$ and the leaves $b$, separate from the leaves $a$, opposite to the bends $d$, the latter permitting such separation. Consequently there are in each spring two sets of springs operating in reversed direction, and formed by the leaves $b\ c$ and leaves $a\ b$, the duplex springs, when in service, riding on the bends $e\ d$. This increases the resiliency of the spring and causes it to be gentle and easy in operation, it also being noticed that the springs $c$ are longer than the springs $b$, and the clips $g$ are beyond or outside of the clips $f$, thus assisting in producing the advantages stated.

In order to guard against or prevent jumping of the springs or separation of the body from the spar when the leaves $c$ separate from the leaves $b$, the clips $f\ g$ are formed with eyes, to which are connected chains or straps B, which are of such length that they limit the separation of said leaves $c\ b$ or body and spar beyond the point where such separation would cause violent and abrupt action or jumping of the springs or body of the vehicle without, however, interfering with the resiliency thereof.

If desired, the springs of a set may be connected by uniting or forming in one the top leaves, $a$, of the two springs forming the set without departing from my invention.

Having thus described my invention, what I claim as new, and desire to secure by Letters Patent, is—

1. The spring A, formed of three continuous leaves one above the other, in combination with the bearing $f$ and the connection $g$, the end of the spring opposite to said connection being adapted to be secured to the body of the vehicle, whereby there are produced two springs, $a\ d\ b$ and $b\ e\ c$, operating in reversed order, substantially as and for the purpose set forth.

2. The spring provided with the clip or bearing $f$ and clip $g$, in combination with the guarding-strap B, connected to said clips, substantially as and for the purpose set forth.

JOSEPH K. CHEW.

Witnesses:
H. E. GARSED,
A. P. GRANT.